(12) United States Patent
Hartlove

(10) Patent No.: US 10,319,268 B2
(45) Date of Patent: Jun. 11, 2019

(54) AMBIENT LIGHT COLOR COMPENSATING DEVICE

(71) Applicant: Nanosys, Inc., Milpitas, CA (US)

(72) Inventor: Jason Hartlove, Los Altos, CA (US)

(73) Assignee: Nanosys, Inc., Milpitas, CA (US)

( * ) Notice: Subject to any disclaimer, the term of this patent is extended or adjusted under 35 U.S.C. 154(b) by 52 days.

(21) Appl. No.: 15/600,031

(22) Filed: May 19, 2017

(65) Prior Publication Data

US 2017/0372650 A1 Dec. 28, 2017

Related U.S. Application Data

(60) Provisional application No. 62/354,495, filed on Jun. 24, 2016.

(51) Int. Cl.
```
G06F 3/14      (2006.01)
G09G 3/00      (2006.01)
G09G 3/20      (2006.01)
G05D 25/02     (2006.01)
```

(52) U.S. Cl.
CPC ............ *G09G 3/007* (2013.01); *G09G 3/2003* (2013.01); *G09G 3/2007* (2013.01); *G05D 25/02* (2013.01); *G06F 3/1423* (2013.01); *G09G 3/2096* (2013.01); *G09G 2320/0242* (2013.01); *G09G 2320/0626* (2013.01); *G09G 2320/0653* (2013.01); *G09G 2320/0666* (2013.01); *G09G 2320/0673* (2013.01); *G09G 2340/06* (2013.01);
(Continued)

(58) Field of Classification Search
CPC ..... G09G 2320/0626; G09G 2360/144; G09G 3/2003; G09G 3/2096; G09G 2320/0666; G09G 2354/00; G09G 2320/0242; G09G 2340/06; G09G 3/007; G09G 2320/0653; G09G 3/2007; G09G 2320/0673; G06F 3/1423; G05D 25/02
See application file for complete search history.

(56) References Cited

U.S. PATENT DOCUMENTS 9,139,770 B2   9/2015 Freeman et al.
9,199,842 B2  12/2015 Dubrow et al.
9,554,102 B2 *  1/2017 Naccari ............... H04N 9/3182
(Continued)

FOREIGN PATENT DOCUMENTS

WO    WO 2010/141580 A2    12/2010

OTHER PUBLICATIONS

International Search Report & Written Opinion of the International Search Authority directed to related International Publication No. PCT/US2017/035179, dated Aug. 1, 2017; 11 pages.

*Primary Examiner* — Muhammad N Edun
(74) *Attorney, Agent, or Firm* — Sterne, Kessler, Goldstein & Fox P.L.L.C.

(57) ABSTRACT

Systems and methods that provide compensation for ambient light in a location of a display device are described. According to various embodiments, a method of compensating for ambient light in a display device is provided. According to the method, an ambient light measurement may be received. The ambient light measurement may include information concerning the intensity of the ambient light present at the location of the display device, the spectrum of the ambient light present at the display device (e.g., color temperature, white balance, or wavelength), and/or both an intensity and a spectrum of the ambient light.

20 Claims, 7 Drawing Sheets

(52) U.S. Cl.
CPC ... *G09G 2354/00* (2013.01); *G09G 2360/144* (2013.01)

(56) References Cited

U.S. PATENT DOCUMENTS

| | | |
|---|---|---|
| 2006/0209551 A1 | 9/2006 | Schweinke et al. |
| 2007/0139405 A1 | 6/2007 | Marcinkievicz |
| 2008/0007156 A1 | 1/2008 | Gibson et al. |
| 2009/0175536 A1* | 7/2009 | Gutta ................ H04N 9/73 382/166 |
| 2012/0050307 A1 | 3/2012 | Mahowald et al. |
| 2013/0100675 A1 | 4/2013 | Sijin et al. |
| 2014/0210802 A1 | 7/2014 | Myers et al. |

* cited by examiner

AMBIENT LIGHT COLOR COMPENSATING DEVICE

CROSS-REFERENCE TO RELATED APPLICATIONS

This application claims the benefit of provisional U.S. Application No. 62/354,495 filed on Jun. 24, 2016, the disclosure of which is incorporated by reference herein in its entirety.

FIELD

The present application relates compensation for the presence of ambient light in display devices.

BACKGROUND

Display devices are ubiquitous in modern society. They are present, for instance, in the mobile devices (e.g., smart phones, laptop computers, tablets, etc.) that nearly everyone carries with them at all times. People use mobile devices in a variety of locations and, consequently, a variety of differently lit settings. As such, there is a desire to produce device displays that have versatility with respect to the ambient light present in the location where the mobile device is being used. However, current solutions leave much to be desired. For instance, available solutions that attempt to compensate for the presence of ambient light can degrade the color gamut performance of a display device and cause washout, among other failures. Better solutions are needed.

BRIEF SUMMARY

Systems and methods that provide compensation for ambient light in a location of a display device are described. According to various embodiments, a method of compensating for ambient light in a display device is provided. According to the method, an ambient light measurement may be received. The ambient light measurement may include information concerning the intensity of the ambient light present at the location of the display device, the spectrum of the ambient light present at the display device (e.g., color temperature, white balance, or wavelength), and/or both an intensity and a spectrum of the ambient light.

The received ambient light measurement can be processed to determine an intermediate mapping from a first color space to a second color space. The mapping could, for instance, be used to address washout gamut degradation resulting from the ambient light at the location of the display device. According to the method, display data can be remapped for the display device based on the intermediate mapping and the remapped display data displayed on the display device.

According to some embodiments, a system configured to modify a gamut of a display device is provided. The system includes an interface that is configured to receive an ambient light measurement from, for instance, an ambient light sensor. One or more processors can be configured to process the received ambient light measurement in order to determine an intermediate mapping from a first color space to a second color space based on the ambient light measurement. The processors may then remap display data to be displayed on a display device according, to the intermediate mapping. The remapped display data can then be displayed on the display device.

A display device that can compensate for the presence of ambient light in its environment is also provided. According to various embodiments, the display device may include an ambient light sensor that is configured to sense ambient light in the location of the display device and to collect information about the ambient light. A video system gamut modifier may also be included in the display device. The gamut modifier is configured to process ambient light information from the ambient light sensor and to generate an intermediate mapping of a first color space to a second color space based on the ambient light measurement. The gamut modifier can also remap display data for the display device based on the intermediate mapping. The display device may include a display driver configured to drive a display using the remapped display data from the video system gamut modifier.

BRIEF DESCRIPTION OF THE DRAWINGS/FIGURES

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

Figure 3:
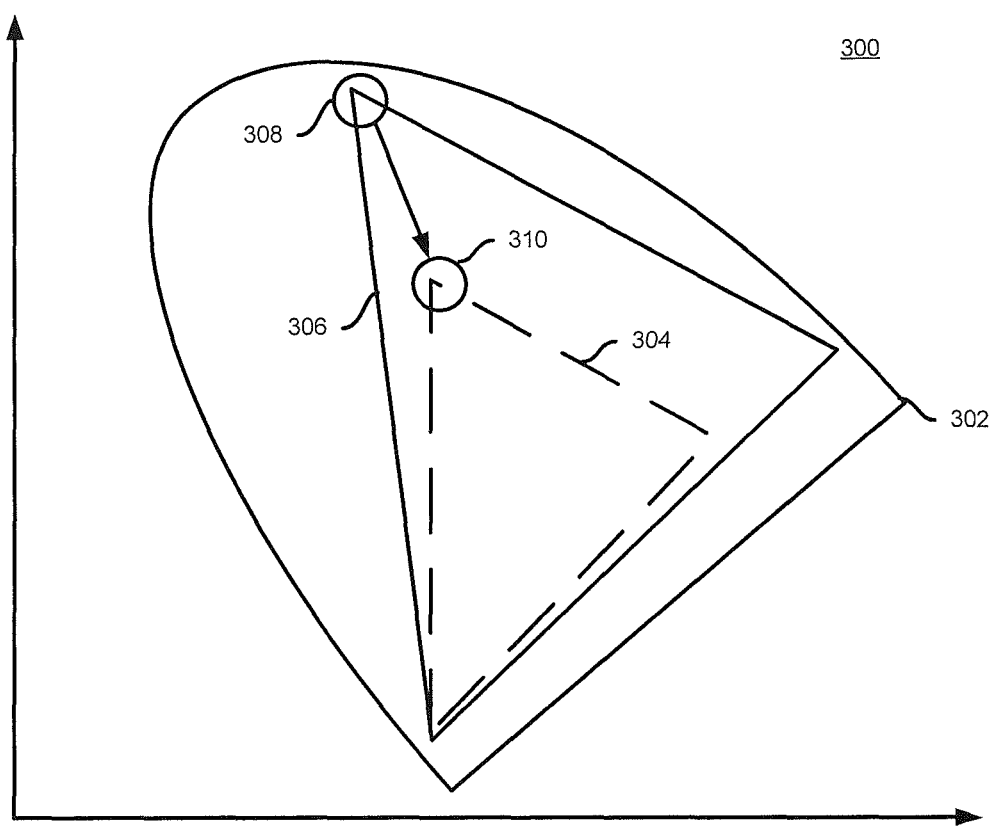

FIG. 3 conceptually depicts a compensation for ambient light according to various embodiments of the disclosure.

Figure 4:
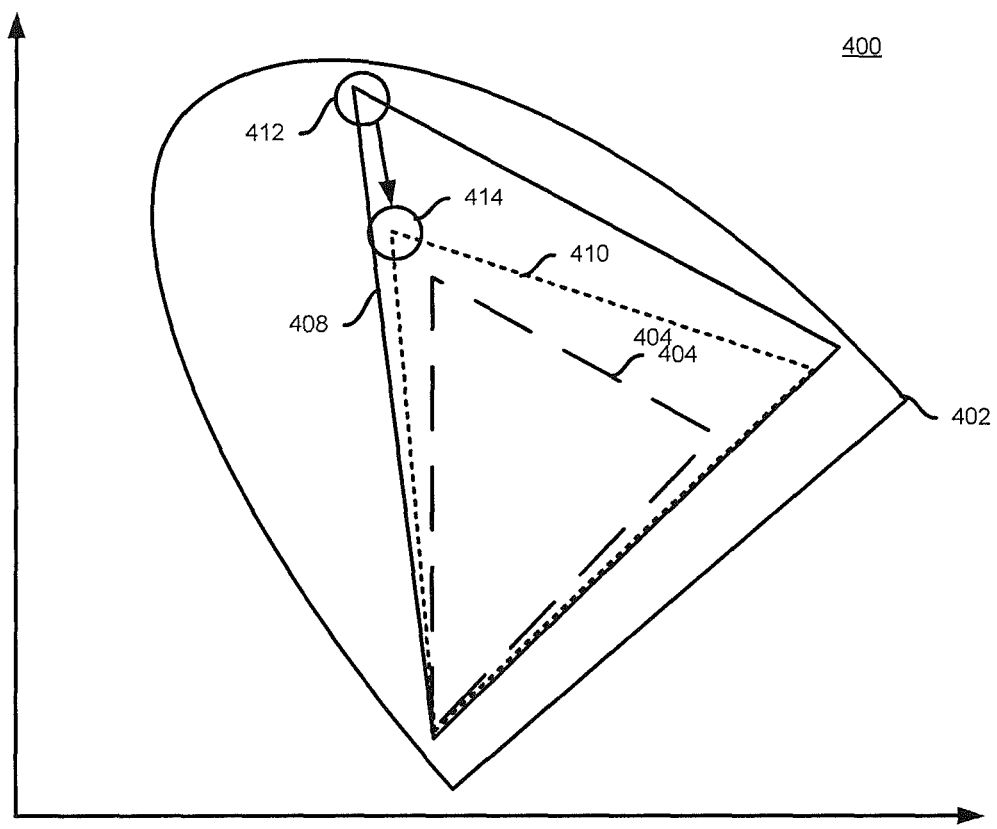

FIG. 4 conceptually depicts a compensation for ambient light according to various embodiments of the disclosure.

Figure 5:
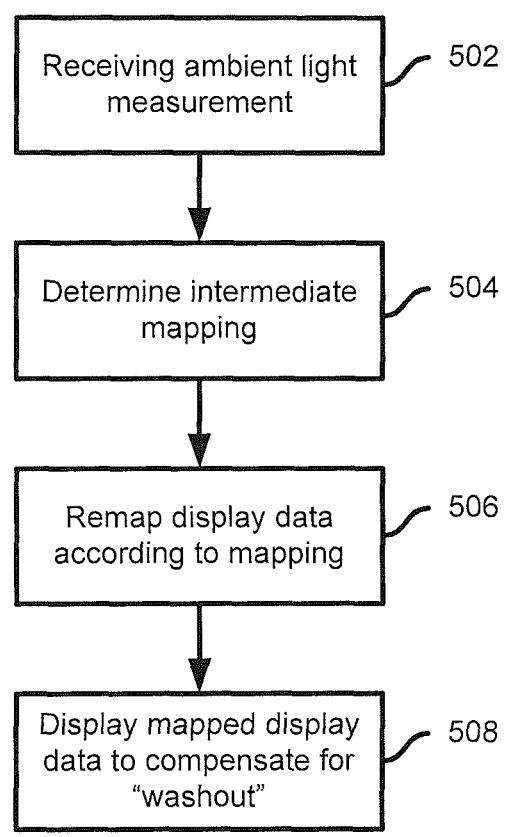

FIG. 5 is a flowchart depicting a method of compensating for the presence of ambient light in a location according to various embodiments of the disclosure.

Figure 6:
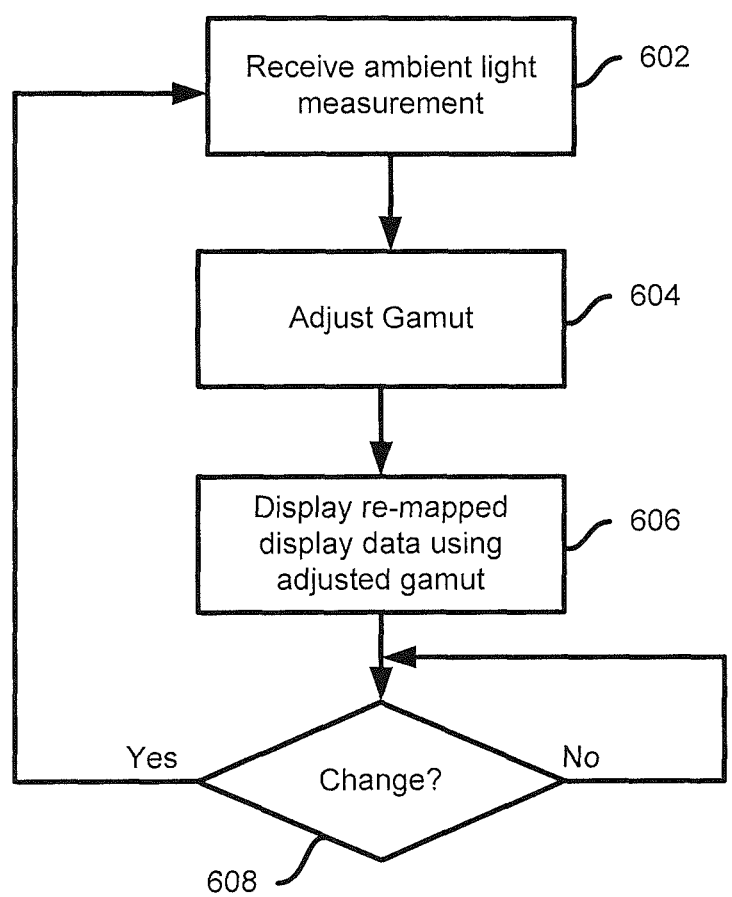

FIG. 6 is a flowchart depicting a method of compensating for the presence of ambient light in a location according to various embodiments of the disclosure.

Figure 7:
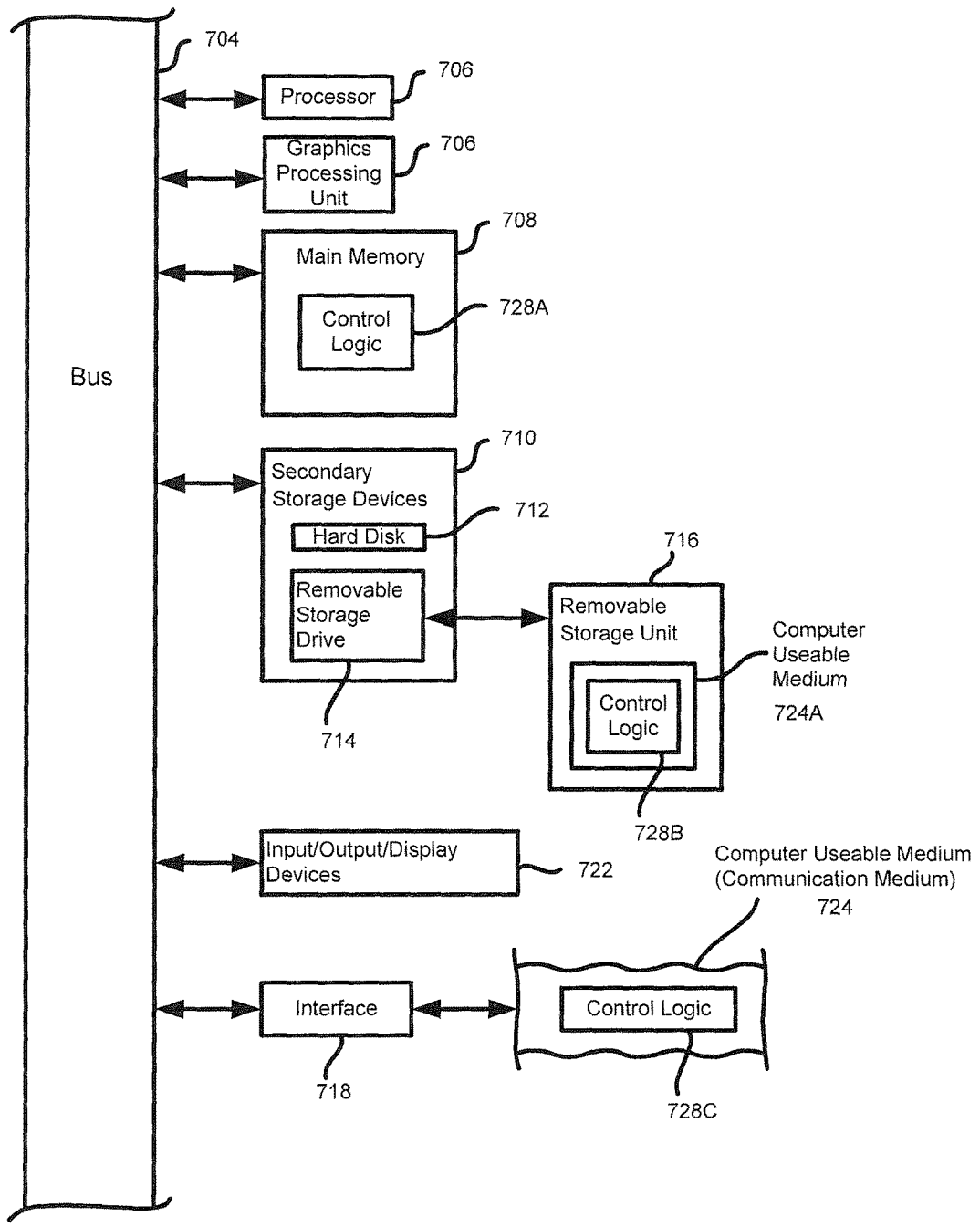

FIG. 7 is a functional block diagram depicting a computer system that can be used to implement various aspects of the various embodiments of the disclosure.

The features and advantages of embodiments of the present invention will become more apparent from the detailed description set forth below when taken in conjunction with the drawings. In the drawings, like reference numbers generally indicate identical, functionally similar, and/or structurally similar elements.

DETAILED DESCRIPTION OF THE INVENTION

This specification discloses one or more embodiments that incorporate the features of this invention. The disclosed embodiment(s) merely exemplify the present invention. The scope of the present invention is not limited to the disclosed embodiment(s). The present invention is defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments whether or not explicitly described.

Figure 1:
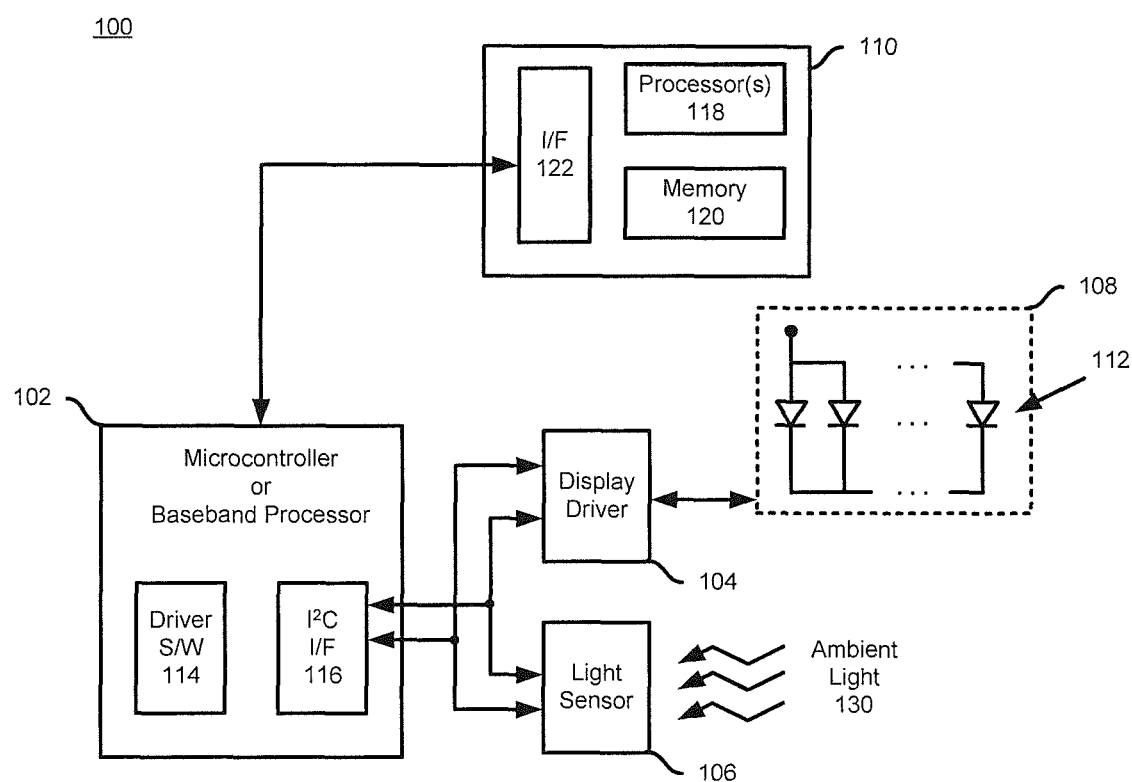
FIG. 1 is a functional block diagram depicting a system that can be used to compensate for the presence of ambient light in a particular setting according to various embodiments of the disclosure.

FIG. 1 is a functional block diagram depicting a display system 100 that can compensate for ambient light in its surrounding environment. As shown in FIG. 1, display system 100 includes a microcontroller or baseband processor 102, a display driver 104, a light sensor 106, and a display 108. The display can comprise, for instance, a number of light emitting diodes (LEDs) 112 as shown in FIG. 1. Liquid crystal display (LCD) or other pixel-based displays can also be employed. Additionally, the display system 100 may include a gamut modifier system 110.

As shown in FIG. 1, the microcontroller or baseband processor 102 may include driver software 114 and an interface 116 between the display driver 104, the light sensor 106, and the microcontroller or baseband processor 102. As shown in FIG. 1, the interface 116 can be an inter-integrated circuit (I²C) bus, but this is just for the purposes of example. In practice the interface 116 can be implemented as any suitable interface or bus that is configured to interface between the display driver 104, the light sensor 106 and the microcontroller or baseband processor 102.

FIG. 1 also depicts interconnection between display driver 104 and light sensor 106. In some embodiments it is possible for the display driver 104 to communicate directly with the light sensor 106 and, for instance, adjust the brightness of a backlight (not shown) in the display based on the detected ambient light intensity. The light sensor 106 may comprise any suitable light sensor that is capable of providing information about the ambient light present at the display device. The ambient light information may include intensity information, spectral information (e.g., a "temperature" of the light), and/or both.

Figure 2A:
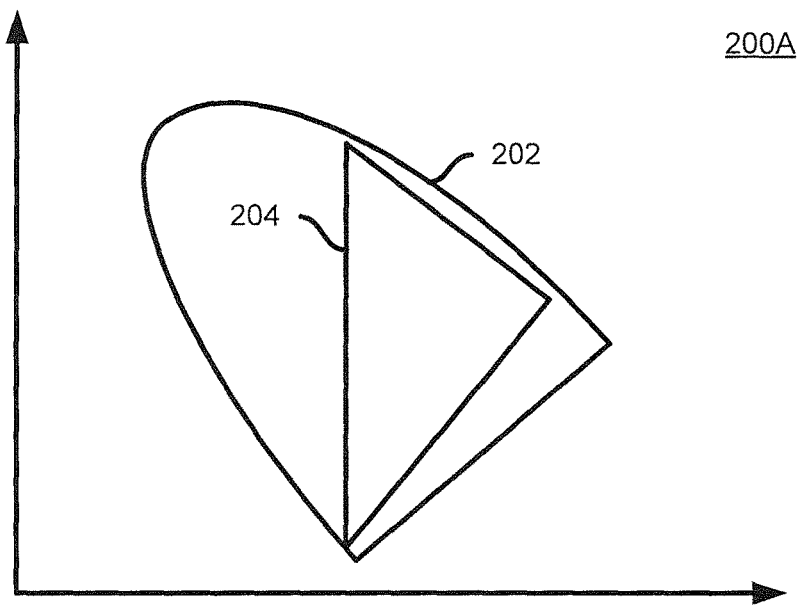
FIGS. 2A and 2B are conceptual renderings that depict different color gamuts according to various embodiments of the disclosure.

Gamut modifier system 110 can use ambient light data received from the light sensor 106 to make adjustments to the color gamut of the display thereby compensating for the ambient light. This process is illustrated using FIGS. 2A and 2B. FIG. 2A depicts chromaticity diagram 200A comprising a color space 202 and a gamut 204. Gamut 204 may, for instance be any desired gamut for a display of a device—for instance gamut 204 may be the gamut for a high definition display (e.g., a Rec. 709 display). In instances where there is a lack of ambient light present in the location of a display device, it can be sufficient to use a display device that produces the desired gamut. However, when ambient light is present, the perceived gamut of the display device can change. This situation is illustrated in FIG. 2B.

Figure 2B:
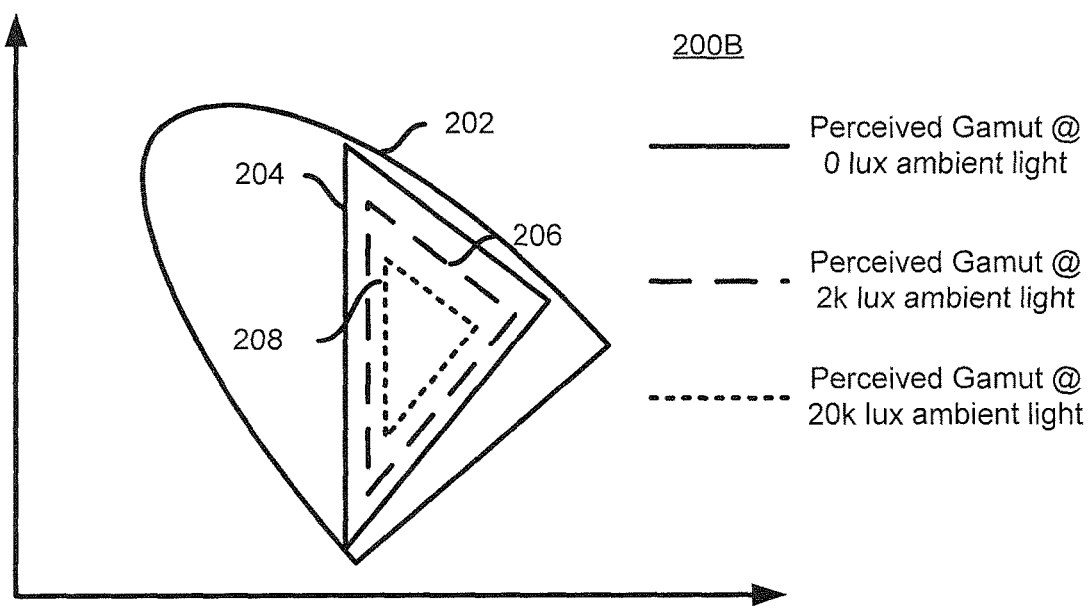

FIG. 2B depicts a chromaticity diagram 200B that contains a color space 202 and a desired gamut 204. As shown in FIG. 2B, when there is no ambient light present (i.e., ambient light is 0 lux), then the perceived gamut (i.e., the gamut that an observer of the display device would perceive) is the same as the desired gamut 204. However, when ambient light is introduced into the location of the display device, the perceived gamut can change. For instance, in the presence of ambient light of 2,000 lux (approximately equivalent to outdoor heavy shade), it can be seen that the perceived gamut 206 changes from the desired gamut 204—in this example, getting smaller. Similarly, in the presence of ambient light of 20,000 lux (approximately equivalent to outdoor indirect sunlight), the perceived gamut 208 shrinks even further with respect to the desired gamut 204. In other words, the presence of ambient light in the location of a display device degrades the perceived color gamut performance of that display device. This color error resulting from the presence of ambient light is known sometimes as "washout." In some applications requiring high color accuracy, washout is undesirable.

To compensate for washout, the ambient light present at the location of a display device can be measured using, for instance, an ambient light sensor such as light sensor 106. The ambient light information can be used to re-code display data for a display device (e.g., video, images, and the like) to a larger gamut on the display device in order to achieve the desired gamut in the presence of ambient light. In many cases it can be desirable to have a display with a gamut that is larger than the desired gamut of the display device, but this may not be strictly necessary in all applications.

FIG. 3 illustrates how display data can be re-coded to achieve a desired gamut in a display device according to various embodiments. FIG. 3 is a chromaticity diagram 300 depicting a color space 302, a desired gamut 304, and a gamut of a display device 308. As shown in FIG. 3, desired gamut 304 is smaller than the display device gamut 308. By way of example, a ultra-high definition television display (i.e., a display conforming to the Rec. 2020 standard, also known as 4 k or 8 k) could be used to achieve a desired gamut 304 that corresponds to a standard with a smaller gamut (e.g., Rec. 709, also known as high-definition or HDTV).

If there is no ambient light present in the location of a display device, the native gamut of the display 308 can be directly mapped to the desired gamut 304. To achieve the desired gamut 304 in the display device gamut 308, the native gamut of the display gamut 308 can be mapped to the desired gamut. For instance, native green primary point 308, which normally has an RGB value of (0,255,0) could be mapped to desired display gamut 304 using R'G'B' values of (100,255,40). Similar mappings can be made for the other primary points to achieve the desired gamut 304 thereby achieving an accurate perceived color display.

FIG. 4 illustrates how display data can be re-coded to achieve a desired gamut in a display device according to various embodiments. Similarly, to FIG. 3, FIG. 4 is a chromaticity diagram 400 depicting a color space 402, a desired gamut 404, a gamut of a display device 408, and an intermediate gamut 410. As shown in FIG. 4, desired gamut 404 is smaller than the display device gamut 408. By way of example, a ultra-high definition television display (i.e., a display conforming to the Rec. 2020 standard, also known as 4 k or 8 k) could be used to achieve a desired gamut 404 that corresponds to a standard with a smaller gamut (e.g., Rec. 709, also known as high-definition or HDTV).

FIG. 4 assumes a situation where ambient light is presence in the location of the display device. As such, the gamut of the display device 408 cannot be directly mapped to the desired gamut 404. Instead, the gamut of the display device 408 must be mapped to an intermediate gamut 410 in order to achieve perceived color corresponding to the desired gamut 404. Returning to the example of mapping green primary, the green primary could be mapped, which normally has an RGB value of (0,255,0), could be mapped to intermediate display gamut 410 using R'G'B' values of (80,255,10). This can ensure that the perceived color display corresponds to the desired color gamut 404. In general, the size of the intermediate gamut 410 will increase with the ambient light. That is, the intermediate gamut 410 will be larger if ambient light is measured to be 20 k lux than if the ambient light is measured to be 1 k lux.

FIG. 5 depicts a method 500 of mapping the native gamut of a device 408 to an intermediate gamut 410 to achieve a desired perceived gamut 404. For ease of explanation, FIG. 5 will be described with reference to FIGS. 1 and 4, but it should be understood that the method is not limited to the embodiments described with respect to these figures. Method 500 can be performed by a separate gamut modifier system 110 as shown in FIG. 1, but it could also be performed directly by, for instance, a microcontroller or baseband processor 102.

As shown in FIG. 5, method 500 begins by receiving an ambient light measurement from a light sensor such as light sensor 106. The ambient light information may include an intensity of the ambient light, spectral information (e.g., a "temperature" of the light) about ambient light present at the location of the display device, and/or both. The ambient light information can then be used to determine an intermediate mapping at step 504, as showing in FIG. 5. For instance, if the ambient light information provided by the light sensor 106 indicates that the ambient light has an intensity of 500 lux, the gamut modifier system 110 may map the native primary green from RGB (0,255,0) to an intermediate value of R'G'B' (80,255,10) in order to compensate for the washout resulting from the presence of ambient light at the location of the display device.

At step 506, display data to be displayed on a display device (such as display device 108) can be re-mapped according to the intermediate mapping determined in step 504. For instance, the microcontroller or baseband processor 102 can re-map received display data according to the intermediate mapping determined by the gamut modifier system 110. The re-mapped display data can then be displayed on display device 108 by display driver to compensate for the washout at step 508.

According to some embodiments, it is possible to dynamically adjust the intermediate mapping 410 dynamically as ambient light conditions change in the location of the display device 100. FIG. 6 is a flowchart depicting one such method 600.

As shown in FIG. 6, the method 600 begins by receiving an ambient light information with an ambient light measurement at step 602. As discussed above with respect to FIG. 5, the ambient light information may include an intensity of the ambient light, spectral information (e.g., a "temperature" of the light) about ambient light present at the location of the display device, and/or both. At step 604, the intermediate gamut 410 can be adjusted based on the received ambient light information. This can be accomplished, for instance using the method 500 outlined in FIG. 5. At step 606, display data to be displayed on display device 108 can be re-mapped using the adjusted intermediate gamut determined at step 604 and the re-mapped display data can then be displayed on the display device 108.

At step 608, the method 600 can determine whether there has been a change in the ambient light information. The method 600 can evaluate whether a change in the ambient light has occurred at predetermined intervals (e.g., 10 s, 30 s, 1 min, . . . etc.) Alternatively, the method 600 may continuously monitor data from the light sensor 106 to evaluate whether a change in the ambient light 130 has occurred. According to some embodiments, the method can alternate between continuously monitoring the ambient light level and evaluating at pre-determined intervals based on, for instance, user preferences and/or the need for responsiveness to changing ambient light levels.

If no change in the ambient light level is detected at step 608, then the method 600 loops back to wait for change. However, if a change is detected at step 608, then the method 600 loops back to step 602 and the intermediate gamut is adjusted to respond to the change in ambient light.

The various embodiments described above can be implemented, for example, using one or more well-known computer systems, such as computer system 700 shown in FIG. 7. For instance some or all of display system 100 could be implemented using components of computer system 700, which can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method of compensating for ambient light in a display device, comprising:
   receiving an ambient light measurement, wherein the ambient light measurement comprises intensity information relating to the ambient light in a location of the display device;
   determining an intermediate mapping from a first color space to a second color space based at least on the ambient light measurement;
   remapping a display data for the display device based on the intermediate mapping; and
   displaying the remapped data on the display device.

2. The method of claim 1, wherein the ambient light measurement comprises spectral information relating to ambient light in a location of the display device.

3. The method of claim 1, wherein the second color space is larger than the first color space.

4. The method of claim 1, wherein a size of the second color space depends on an intensity of the ambient light associated with the ambient light measurement.

5. The method of claim 1, further comprising:
   receiving an updated ambient light measurement; and
   updating the intermediate mapping to map the first color space to a third color space having a size that is different from a size of the second color space.

6. The method of claim 1, wherein the ambient light measurement is received from an ambient light sensor associated with the display device.

7. The method of claim 1, wherein the first color space comprises a display gamut.

8. The method of claim 7, wherein the intermediate mapping is configured such that the display data, when displayed on the display device, appears to match the display gamut when viewed in the ambient light corresponding to the ambient light measurement.

9. The method of claim 7, wherein the second color space is larger than the display gamut.

10. A system configured to modify a gamut of a display device, the system comprising:
    an interface configured to receive an ambient light measurement, wherein the ambient light measurement comprises intensity information relating to ambient light in a location of the display device; and
    one or more processors configured to:
       process the ambient light measurement to determine an intermediate mapping from a first color space to a second color space based at least on the ambient light measurement;
       remap a display data for the display device based on the intermediate mapping; and
       display the remapped data on the display device.

11. The system of claim 10, wherein the ambient light measurement received by the interface comprises spectral information relating to the ambient light in the location of the display device.

12. The system of claim 10, wherein the one or more processors are configured to map the first color space to the second color space such that the second color space is larger than the first color space.

13. The system of claim 10, wherein a size of the second color space depends on an intensity of the ambient light associated with the ambient light measurement.

14. The system of claim 10, wherein the interface is further configured to receive an updated ambient light measurement.

15. The system of claim 14, wherein the one or more processors are further configured to update the intermediate mapping to map the first color space to a third color space having a size that is different from a size of the second color space.

16. The system of claim 10, wherein the one or more processors are configured to determine the intermediate mapping such that the display data, when displayed on the display device, appears to match a display gamut when viewed in the ambient light corresponding to the ambient light measurement.

17. A display device, comprising:
an ambient light sensor configured to sense ambient light information, wherein the ambient light information comprises intensity information relating to ambient light in a location of the display device; and
a video system gamut modifier configured to:
process the ambient light information to determine an intermediate mapping from a first color space to a second color space based at least on the ambient light measurement;
remap a display data for the display device based on the intermediate mapping; and
a display driver configured to drive a display according to the remapped display data from the video system gamut modifier.

18. The display device of claim 17, wherein the video system gamut modifier is further configured to update the intermediate mapping to map the first color space to a third color space having a size that is different from a size of the second color space.

19. The display device of claim 17, wherein the video system gamut modifier is further configured to map the first color space to the second color space such that the second color space is larger than the first color space.

20. The display device of claim 17, wherein the ambient light information comprises spectral information relating to the ambient light in the location of the display device.

* * * * *